United States Patent
Buckhalt et al.

(10) Patent No.: US 9,487,248 B1
(45) Date of Patent: Nov. 8, 2016

(54) TONNEAU COVER WITH INTEGRATED STORAGE COMPARTMENT ACCESSED THROUGH THE TAILGATE

(71) Applicant: FORD GLOBAL TECHNOLOGIES, LLC, Dearborn, MI (US)

(72) Inventors: Brandon Buckhalt, Belleville, MI (US); Venkatesh Krishnan, Canton, MI (US); Vikas Bhatt, Canton, MI (US); Ravikumar Ranganathan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/737,948

(22) Filed: Jun. 12, 2015

(51) Int. Cl.
| | |
|---|---|
| *B62D 33/04* | (2006.01) |
| *B65D 88/22* | (2006.01) |
| *B62D 33/08* | (2006.01) |
| *B60J 7/14* | (2006.01) |

(52) U.S. Cl.
CPC .............. *B62D 33/042* (2013.01); *B60J 7/141* (2013.01); *B62D 33/08* (2013.01); *B65D 88/22* (2013.01)

(58) Field of Classification Search
CPC .......... B60J 7/1607; B60J 7/141; B60P 7/02; B60R 9/00; B60R 9/06; B62D 33/04; B62D 33/042; B65D 29/02; B65D 88/16; B65D 88/22

USPC .......... 296/24.4, 37.6, 37.7, 100.01, 136.03; 383/38, 121.1
See application file for complete search history.

(56) References Cited

U.S. PATENT DOCUMENTS

| | | | |
|---|---|---|---|
| 5,207,470 A | 5/1993 | Rafi-Zadeh | |
| 6,435,586 B2 * | 8/2002 | Getzschman | B60R 9/00 224/404 |
| 6,513,851 B2 | 2/2003 | Henderson | |
| 6,520,558 B1 | 2/2003 | Katterloher et al. | |
| 6,585,309 B2 | 7/2003 | Dicke | |
| 7,758,092 B2 * | 7/2010 | Kolpasky | B60R 5/045 296/24.43 |
| 8,931,819 B2 | 1/2015 | Daniel | |
| 2003/0193209 A1 | 10/2003 | Melvani | |

FOREIGN PATENT DOCUMENTS

WO     2009155226 A2    12/2009

* cited by examiner

*Primary Examiner* — Jason S Daniels
(74) *Attorney, Agent, or Firm* — Jason Rogers; King & Schickli, PLLC

(57) ABSTRACT

A tonneau cover is provided for a pickup truck. The tonneau cover includes a body having a vehicle forward end and a vehicle rearward end. Further, the tonneau cover includes a collapsible storage assembly that depends from the body and has at least one rearwardly opening storage compartment accessible through an open tailgate of the pickup truck.

19 Claims, 5 Drawing Sheets

TONNEAU COVER WITH INTEGRATED STORAGE COMPARTMENT ACCESSED THROUGH THE TAILGATE

TECHNICAL FIELD

This document relates generally to the vehicle equipment field and, more particularly, to a tonneau cover for a pickup truck that incorporates a collapsible storage assembly with at least one rearwardly opening storage compartment that is conveniently accessible through an open tailgate of the pickup truck.

BACKGROUND

Most pickup trucks that are used by nonbusiness customers are equipped with tonneau covers which extend across the cargo box and conceal the interior of the cargo box when closed. Operators that use these vehicles for grocery or other shopping need to store purchased items in the cab of the pickup truck or in the cargo box.

Storing items in the cargo box may be problematic for a number of reasons. More specifically, shopping bags do not remain in the same place in the cargo box of a moving vehicle. Accordingly breakable and crushable items like eggs, bread, light bulbs as well as bottled drinks, condiments and food items are not safe to transport in the cargo box due to the potential for damage. It should further be appreciated that the cargo box is often dirty or muddy and an operator may not wish to expose the groceries or other items in the shopping bag to this dirty environment.

While storing groceries and shopping bags inside the vehicle may seem to be a simple solution, it is often inconvenient to do so when there are many passengers. Further, while many pickup trucks incorporate tool boxes which provide a smaller storage space potentially ideal for shopping bags, it should be appreciated that such boxes are expensive, very heavy and often do not provide the desired flexibility since they cannot be moved out of the way if the entire cargo box needs to be used by the operator.

This document relates to a new and improved tonneau cover incorporating an integrated storage compartment that is easily accessed through an open tailgate of the pickup truck and better addresses the need for storage space for shopping bags. This includes the ability to hold and protect breakable and crushable items from damage due to shifting during vehicle operation.

SUMMARY

In accordance with the purposes and benefits described herein, a tonneau cover is provided for a pickup truck. That tonneau cover comprises a body having a vehicle forward end and a vehicle rearward end as well as a collapsible storage assembly that depends from the body. The collapsible storage assembly has at least one rearwardly opening storage compartment that is accessible through an open tailgate of the pickup truck.

More specifically, the collapsible storage assembly includes a first row of storage compartments and a second row of storage compartments. The collapsible storage assembly is selectively displaceable between a collapsed, stowed position adjacent the body, a first deployed position wherein the first row of storage compartments are deployed and a second deployed position wherein the first row of storage compartments and the second row of storage compartments are deployed. In addition, the tonneau cover includes a fastening system for securing the collapsible storage assembly in the collapsed, stowed position, the first deployed position and the second deployed position.

In one possible embodiment, the collapsible storage assembly includes flexible sidewalls and a flexible front wall. Further, the collapsible storage assembly includes a first floor connected to the flexible sidewalls.

In yet another possible embodiment, the collapsible storage assembly includes a second floor connected to the flexible sidewalls wherein the second floor overlies the first floor. Together the first floor, the flexible sidewalls and the flexible front wall define a first storage compartment row while the second floor, the flexible sidewalls and the flexible front wall define a second storage compartment row overlying the first storage compartment row.

In one possible embodiment, the collapsible storage assembly further includes at least one flexible partition wall between the flexible sidewalls that provides multiple storage compartments in at least one row of the two storage compartment rows. In one possible embodiment, the flexible sidewalls and the flexible front wall are made from a cloth material that will fold and collapse. In another possible embodiment, the flexible sidewalls and the flexible front wall are made from a mesh material that will fold and collapse. In either of these embodiments, the first floor and/or the second floor is made from a rigid panel.

Still further, the tonneau cover includes a fastening system for securing the collapsible storage assembly in one of the collapsed, stowed position adjacent the body, the first deployed position wherein the first storage compartment row is deployed and the second deployed position wherein the first storage compartment row and the second storage compartment row are both deployed. That fastening system may be broadly described as including a plurality of first opposed fastening elements on the pickup truck and a plurality of second opposed fastening elements on the collapsible storage assembly.

The plurality of first opposed fastening elements are vertically spaced on the pickup truck outboard of the collapsible storage assembly. The plurality of second opposed fastening elements are provided at spaced locations along the collapsible storage assembly.

More specifically, a first set of the second opposed fastening elements is provided adjacent the first floor and a second set of the second opposed fastening elements is provided adjacent the second floor. The first set of second opposed fastening elements are secured to: (a) an uppermost set of the first opposed fastening elements when the collapsible storage assembly is in the collapsed, storage position, (b) an intermediate set of the first opposed fastening elements when the collapsible storage assembly is in the first deployed position, and (c) a lowermost set of first opposed fastening elements when the collapsible storage assembly is in the second deployed position.

In one possible embodiment, the plurality of first opposed fastening elements comprises a plurality of anchoring loops and the plurality of second opposed fastening elements comprises a plurality of mounting straps.

In the following description, there are shown and described several preferred embodiments of the tonneau cover. As it should be realized, the tonneau cover is capable of other, different embodiments and its several details are capable of modification in various, obvious aspects all without departing from the tonneau cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tonneau cover and together with the description serve to explain certain principles thereof. In the drawing figures:

FIG. 5a illustrates a fastening strap in the unfastened state while FIG. 5b illustrates a fastening strap secured to a fastening loop.

Reference will now be made in detail to the present preferred embodiments of the tonneau cover, examples of which are illustrated in the accompanying drawing figures.

DETAILED DESCRIPTION

Figure 1:
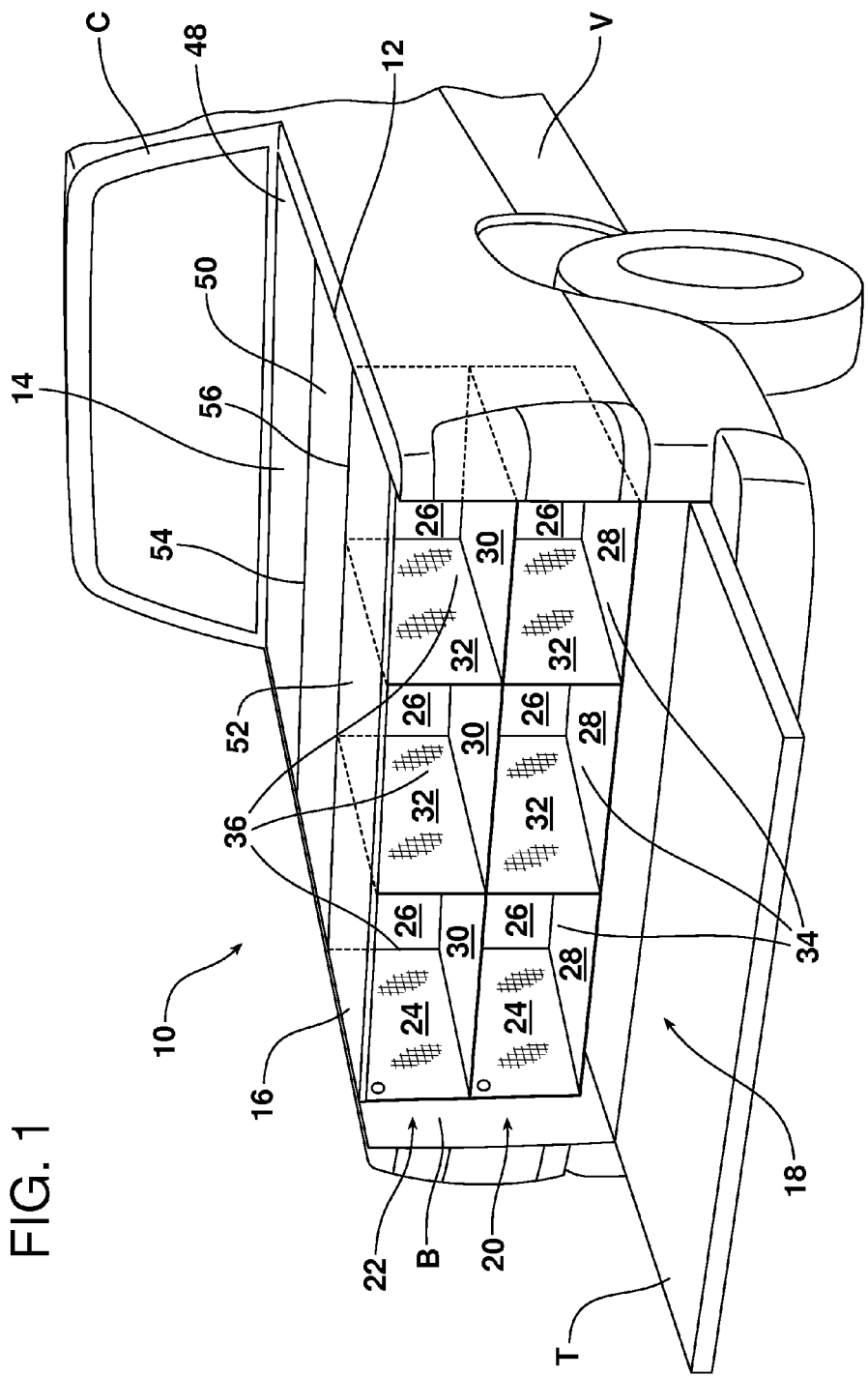
FIG. 1 is a rear perspective illustrating a collapsible storage assembly of the tonneau cover in the fully or second deployed position.

Reference is now made to FIG. 1 illustrating the tonneau cover 10 that is the subject matter of this document. As illustrated, the tonneau cover 10 includes a body 12 having a vehicle forward end 14 that is positioned adjacent the cab C of the pickup truck V and a vehicle rearward end 16 that is positioned adjacent to the tailgate T of the pickup truck when the body is properly mounted to the pickup truck overlying the cargo box B. A collapsible storage assembly, generally designated by reference numeral 18, depends from the body 12. The collapsible storage assembly 18 includes a first row of storage compartments 20 and a second row of storage compartments 22. The storage compartments 20, 22 are provided at the rearward end 16 of the body 12 and all open rearwardly so as to be readily accessible through the open tailgate T of the pickup truck V.

Figure 4:
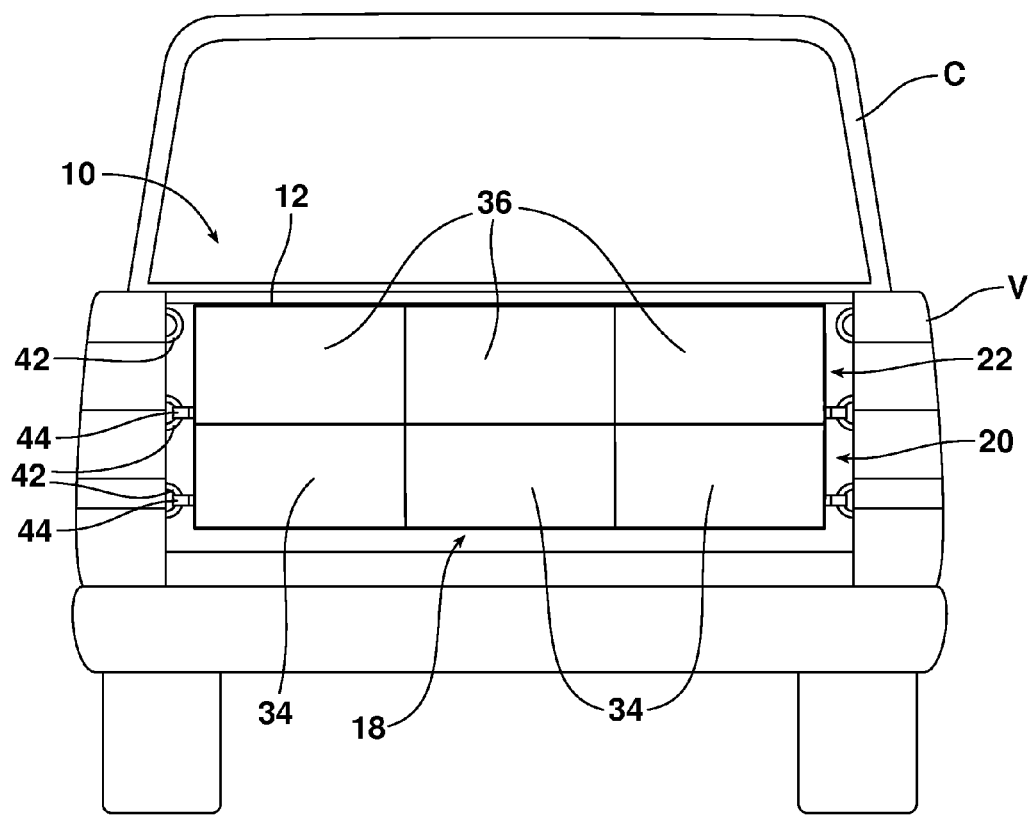
FIG. 4 is a detailed rear elevational view illustrating the collapsible storage assembly of the tonneau cover in the second deployed position wherein the first and second rows of storage compartments are easily accessed through the open tailgate of the pickup truck.

As best illustrated in FIGS. 1 and 4, the collapsible storage assembly 18 includes opposed flexible sidewalls 24 and a flexible front wall 26. The sidewalls 24 and front wall 26 are made from a flexible, folding material such as a cloth or mesh.

The collapsible storage assembly 18 also includes a first floor 28 connected to the sidewalls 24 and the front wall 26. Further, the collapsible storage assembly 18 includes a second floor 30 also connected to the sidewalls 24 and front wall 26 and oriented so as to overlie the first floor 28.

Together, the first floor 28, the flexible sidewalls 24 and the flexible front wall 26 define the first storage compartment row 20. Together the second floor 30, the flexible sidewalls 24 and the flexible front wall 26 function together to form the second storage compartment row 22.

As further illustrated in FIGS. 1 and 4, the collapsible storage assembly 18 may include one or more flexible partition walls 32 which may be made of a cloth or mesh material like the sidewalls 24 and the front wall 26. As illustrated, the partition walls 32 provide multiple storage compartments 34, 36. In one useful embodiment, the first floor 28 and the second 30 are both made from rigid panels of plastic, wood or other appropriate material.

Figure 2:
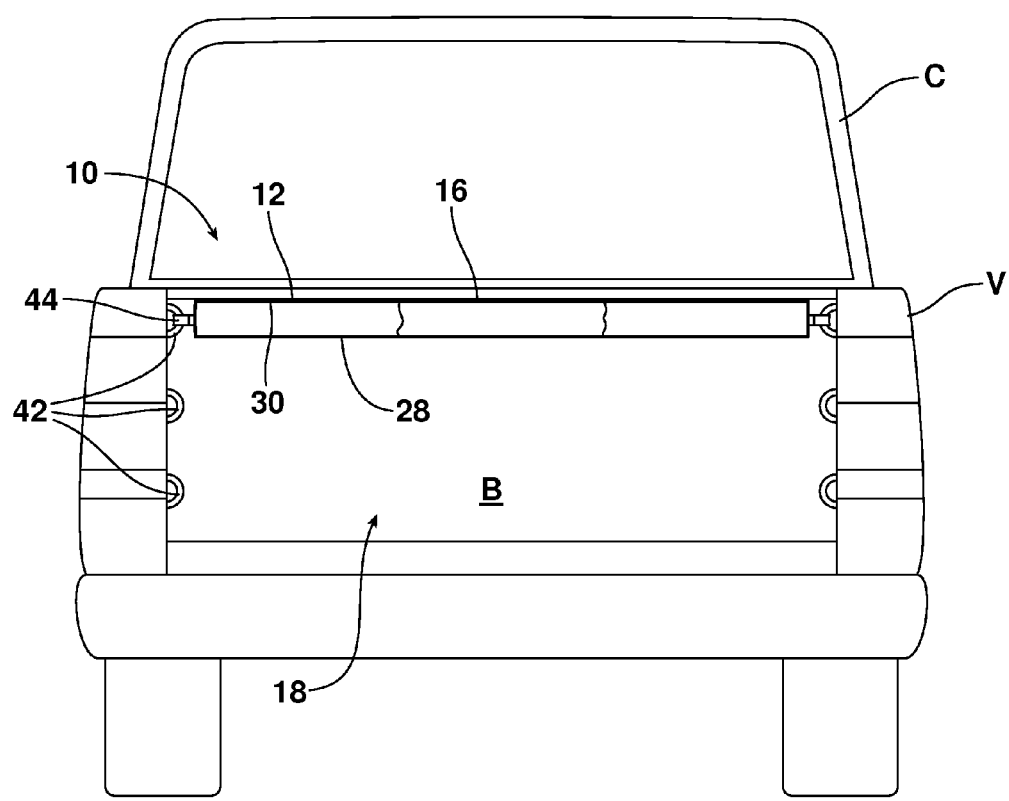
FIG. 2 is a detailed rear elevational view illustrating the collapsible storage assembly of the tonneau cover in the collapsed, storage position.
Figure 3:
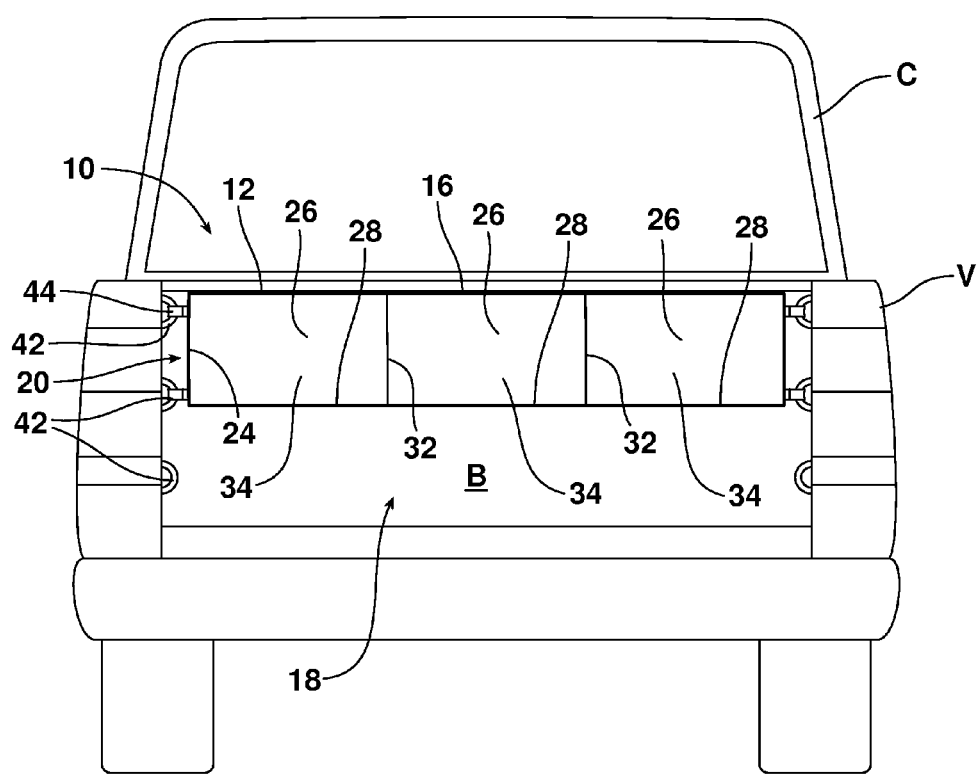
FIG. 3 is a detailed rear elevational view illustrating the collapsible storage assembly of the tonneau cover in the first deployed position wherein the first row of storage compartments is easily accessed through the open tailgate.

As best illustrated in FIGS. 2-4, the collapsible storage assembly 18 is selectively displaceable between a collapsed, stowed position adjacent the body 12 as illustrated in FIG. 2, a first deployed position wherein the first row 20 of storage compartments 34 is deployed as illustrated in FIG. 3 and a second or fully deployed position wherein the first and second rows 20, 22 of storage compartments 34, 36 are both deployed.

Figure 5A:
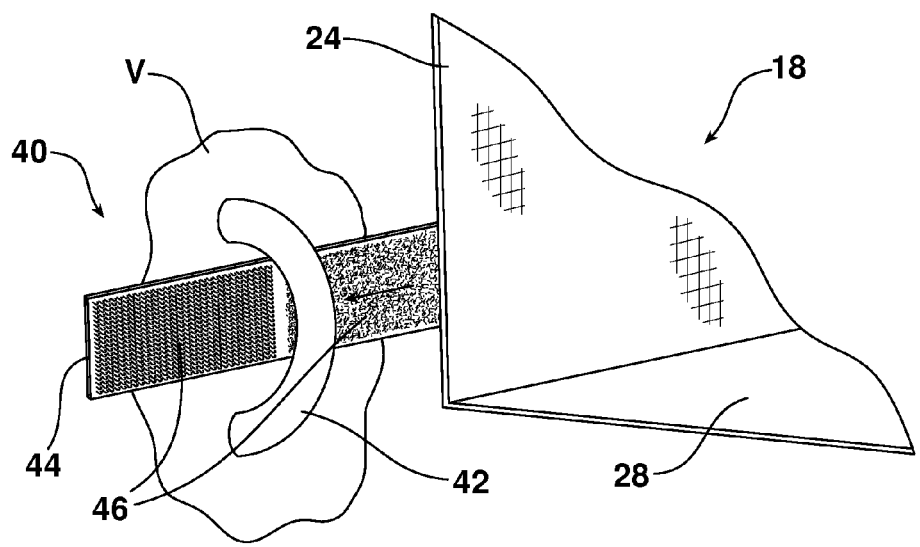
FIGS. 5a and 5b are detailed perspective views illustrating the fastening system utilized to secure the collapsible storage assembly in the desired position within the cargo box of the pickup truck.
Figure 5B:
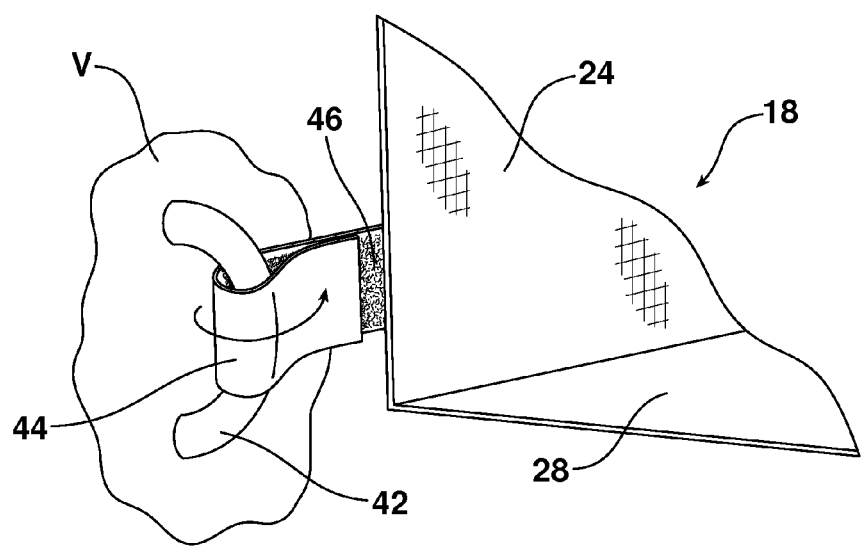

A fastening system, generally designated by reference numeral 40 in FIGS. 5a and 5b, allows one to secure the collapsible storage assembly 18 in any of the collapsed, stowed position, the first deployed position and the second deployed position. As illustrated in FIGS. 2-4, that fastening system 40 includes a plurality of first opposed fastening elements 42 provided on or secured to the pickup truck V and a plurality of second opposed fastening elements 44 provided on the collapsible storage assembly 18. In the illustrated embodiment, the first opposed fastening elements 42 comprise anchoring loops and the second opposed fastening elements 44 comprise fastening or mounting straps including hook and loop fasteners 46.

As illustrated, the anchoring loops 42 are vertically spaced on the opposed sidewalls of the pickup truck V outboard of the collapsible storage assembly 18. The mounting straps 44 are provided at spaced positions on the collapsible storage assembly 18. In the illustrated embodiment, opposed mounting straps 44 are provided on the flexible sidewalls 24 adjacent each of the floors 28, 30.

As illustrated in FIG. 2, the collapsible storage assembly 18 may be secured in the collapsed, stowed position by passing the opposed mounting straps 44 adjacent the first or bottommost floor 28 through the uppermost anchoring loops 42 adjacent the body 12 and securing the straps in position by means of the hook and loop fasteners 46 on the straps (see also FIGS. 5a and 5b illustrating how the straps are fastened to the loops).

As illustrated in FIG. 3, the collapsible storage assembly 18 may be fastened in the first deployed position by securing the straps 44 adjacent the first floor 28 to the intermediate set of anchoring loops 42 with the second floor 30 held adjacent the body 12 by securing the opposed straps 44 adjacent the second floor to the uppermost anchoring loops.

As illustrated in FIG. 4, the collapsible storage assembly 18 may be fastened in the second deployed position by securing the straps 44 adjacent the first floor 28 to the lowermost anchoring loops 42 and the straps 44 adjacent the second floor 30 to the intermediate anchoring loops.

It should be appreciated that the straps 44 may be conveniently and easily hooked and unhooked to the anchoring loops 42 by releasing and re-securing the hook and loop fasteners 46 on the straps as necessary when adjusting the position of the collapsible storage assembly 18. Further, it should be appreciated that the straps 46, when fastened or connected to the anchoring loops 42, securely hold the collapsible storage assembly 18 limiting any shifting of the collapsible storage assembly 18 within the cargo box B of the pickup truck V when the vehicle is in operation. Thus, groceries and other items held in the storage compartments 34, 36 are well protected from shifting and potential breakage during vehicle operation.

As should be further appreciated, the ability to access the storage compartments 34, 36 through the open tailgate T when loading or unloading the storage assembly 18 is most convenient and advantageously eliminates any need to reach over the sidewalls of the cargo box B. Thus, the collapsible storage assembly is ergonomically friendly. In fact, the upper horizontal surface of the open tailgate may act as a temporary storage shelf for holding items as one loads them into the storage compartments 34, 36 in a most convenient and efficient manner.

The foregoing has been presented for purposes of illustration and description. It is not intended to be exhaustive or to limit the embodiments to the precise form disclosed. Obvious modifications and variations are possible in light of the above teachings. For example, the body 12, as illustrated in the drawing figures, includes three sections 48, 50, 52 connected together by living hinges 54, 56. Other body configurations are possible including, for example, a single rigid body. Further, the illustrated fastening system 40 comprises cooperating anchoring loops 42 and straps 44. Other structures appropriate for this purpose could be substituted for the loops 42 and straps 44. For example, the loops 42 and straps 44 may be replaced by cooperating clips, carabineers or other fastening structures. All such structures and variations are within the scope of the appended claims when interpreted in accordance with the breadth to which they are fairly, legally and equitably entitled.

What is claimed:

1. A tonneau cover for a pickup truck, comprising:
   a body having a vehicle forward end and a vehicle rearward end; and
   a collapsible storage assembly depending from said body and having at least one rearwardly opening storage compartment accessible through an open tailgate of said pickup truck, wherein said collapsible storage assembly includes a first row of storage compartments and a second row of storage compartments, and wherein said collapsible storage assembly is selectively displaceable between a collapsed, stowed position adjacent said body, a first deployed position wherein said first row of storage compartments is deployed and a second deployed position wherein said first row of storage compartments and said second row of storage compartments are deployed.

2. The tonneau cover of claim 1, further including a fastening system for securing said collapsible storage assembly in said collapsed, stowed position, said first deployed position and said second deployed position.

3. The tonneau cover of claim 1, wherein said collapsible storage assembly includes flexible sidewalls and a flexible front wall.

4. The tonneau cover of claim 3, wherein said collapsible storage assembly includes a first floor connected to said flexible sidewalls.

5. The tonneau cover of claim 4, wherein said collapsible storage assembly includes a second floor connected to said flexible sidewalls, said second floor overlying said first floor.

6. The tonneau cover of claim 4, wherein said flexible sidewalls and flexible front wall are made from a cloth material that will fold and collapse.

7. The tonneau cover of claim 6, wherein said first floor is made from a rigid panel.

8. The tonneau cover of claim 4, wherein said flexible sidewalls and said flexible front wall are made from a mesh material that will fold and collapse.

9. The tonneau cover of claim 8, wherein said first floor is made from a rigid panel.

10. A tonneau cover for a pickup truck, comprising:
    a body having a vehicle forward end and a vehicle rearward end; and
    a collapsible storage assembly depending from said body and having at least one rearwardly opening storage compartment accessible through an open tailgate of said pickup truck, wherein said collapsible storage assembly includes flexible sidewalls and a flexible front wall, wherein said collapsible storage assembly includes a first floor connected to said flexible sidewalls, and wherein said collapsible storage assembly includes a second floor connected to said flexible sidewalls, said second floor overlying said first floor.

11. The tonneau cover of claim 10, wherein said first floor and said flexible sidewalls and said flexible front wall define a first storage compartment row and said second floor and said flexible sidewalls and said flexible front wall define a second storage compartment row overlying said first storage compartment row.

12. The tonneau cover of claim 11, wherein said collapsible storage assembly further includes at least one flexible partition wall between said flexible sidewalls providing multiple storage compartments in at least one row of said first storage compartment row and said second storage compartment row.

13. The tonneau cover of claim 11, further including a fastening system for securing said collapsible storage assembly in one of a collapsed, stowed position adjacent said body, a first deployed position wherein said first storage compartment row is deployed and a second deployed position wherein said first storage compartment row and said second storage compartment row are both deployed.

14. The tonneau cover of claim 13, wherein said fastening system includes a plurality of first opposed fastening elements on said pickup truck and a plurality of second opposed fastening elements on said collapsible storage assembly.

15. The tonneau cover of claim 14, wherein said plurality of first opposed fastening elements are vertically spaced on said pickup truck outboard of said collapsible storage assembly.

16. The tonneau cover of claim 15, wherein said plurality of second opposed fastening elements are provided at spaced locations along said collapsible storage assembly.

17. The tonneau cover of claim 16, wherein a first set of said second opposed fastening elements is provided adjacent said first floor and a second set of said second opposed fastening elements is provided adjacent said second floor.

18. The tonneau cover of claim 17, wherein said first set of second opposed fastening elements is secured to: (a) an uppermost set of said first opposed fastening elements when said collapsible storage assembly is in said collapsed, stowed position, (b) an intermediate set of said first opposed fastening elements when said collapsible storage assembly is in said first deployed position, and (c) a lowermost set of said first opposed fastening elements when said collapsible storage assembly is in said second deployed position.

19. The tonneau cover of claim 18, wherein said plurality of first opposed fastening elements comprises a plurality of anchoring loops and said plurality of second opposed fastening elements comprises a plurality of mounting straps.

* * * * *